United States Patent
Kim et al.

(10) Patent No.: US 9,519,054 B2
(45) Date of Patent: Dec. 13, 2016

(54) METHOD AND APPARATUS FOR RECONSTRUCTING DIELECTRIC IMAGE USING ELECTROMAGNETIC WAVES

(71) Applicant: Electronics and Telecommunications Research Institute, Daejeon (KR)

(72) Inventors: Bo Ra Kim, Daejeon (KR); Nikolai Simonov, Daejeon (KR); Seong-Ho Son, Daejeon (KR); Soon Ik Jeon, Daejeon (KR); Hyuk Je Kim, Daejeon (KR); Jong Moon Lee, Daejeon (KR); Hyung Do Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 14/254,439

(22) Filed: Apr. 16, 2014

(65) Prior Publication Data

US 2015/0042508 A1 Feb. 12, 2015

(30) Foreign Application Priority Data

Aug. 9, 2013 (KR) .................. 10-2013-0094863

(51) Int. Cl.
*G01S 13/89* (2006.01)
*G01S 13/88* (2006.01)

(52) U.S. Cl.
CPC ............... *G01S 13/89* (2013.01); *G01S 13/88* (2013.01); *G01S 13/887* (2013.01); *G01S 13/888* (2013.01)

(58) Field of Classification Search
CPC ...... G01S 13/88; G01S 13/888; G01S 13/887; G01S 13/89
USPC ........................................... 342/195
See application file for complete search history.

(56) References Cited

U.S. PATENT DOCUMENTS

| | | | | | |
|---|---|---|---|---|---|
| 5,392,046 A | * | 2/1995 | Hughes | ............... | G01H 17/00 342/126 |
| 5,588,032 A | * | 12/1996 | Johnson | ............... | A61B 5/4312 378/8 |
| 5,835,054 A | * | 11/1998 | Warhus | ............... | G01S 7/292 342/179 |
| 5,841,288 A | * | 11/1998 | Meaney | ............... | G01N 22/00 324/637 |
| 6,005,916 A | * | 12/1999 | Johnson | ............... | A61B 5/05 378/87 |

(Continued)

FOREIGN PATENT DOCUMENTS

| | | |
|---|---|---|
| KR | 1020100068542 A | 6/2010 |
| KR | 1020130010156 A | 1/2013 |

*Primary Examiner* — Peter Bythrow
(74) *Attorney, Agent, or Firm* — William Park & Associates Ltd.

(57) ABSTRACT

A method for reconstructing a dielectric image using electromagnetic waves, comprising: acquiring a measurement value of the electromagnetic waves; generating a matching system matrixes between the meshes; generating a smoothed dyadic Green's function matrix; generating an electromagnetic wave calculation value; calculating a misfit error between the acquired electromagnetic wave measurement value and the generated electromagnetic wave calculation value, and checking whether a change of the calculated misfit error satisfies a predetermined optimization determination condition; updating dielectric parameters at the meshes; and outputting a reconstructed dielectric image in the image reconstruction region.

20 Claims, 4 Drawing Sheets (56) References Cited

U.S. PATENT DOCUMENTS

| | | | | |
|---|---|---|---|---|
| 6,448,788 B1* | 9/2002 | Meaney | ............... | A61B 5/0507 |
| | | | | 324/637 |
| 6,587,540 B1* | 7/2003 | Johnson | ............... | A61B 5/4312 |
| | | | | 378/4 |
| 6,700,526 B2* | 3/2004 | Witten | ...................... | G01S 7/28 |
| | | | | 342/175 |
| 7,825,667 B2* | 11/2010 | Fang | ........................ | A61B 5/05 |
| | | | | 324/637 |
| 8,330,642 B2* | 12/2012 | Jin | ...................... | G01S 13/9035 |
| | | | | 342/159 |
| 8,933,837 B2* | 1/2015 | Okhmatovski | ...... | A61B 5/0507 |
| | | | | 342/195 |
| 8,942,787 B2* | 1/2015 | Tan | ...................... | A61B 5/0522 |
| | | | | 600/407 |
| 8,977,340 B2* | 3/2015 | Golnabi | ............... | A61B 5/0035 |
| | | | | 600/411 |
| 9,167,985 B2* | 10/2015 | Lovetri | ................ | A61B 5/0507 |
| 9,329,263 B2* | 5/2016 | Haynes | .................. | G01S 13/89 |
| 2003/0076254 A1* | 4/2003 | Witten | ...................... | G01S 7/28 |
| | | | | 342/22 |
| 2008/0052052 A1* | 2/2008 | Stearns | ............... | A61B 5/0059 |
| | | | | 703/6 |
| 2012/0155746 A1* | 6/2012 | Byun | .................. | G06T 7/0065 |
| | | | | 382/154 |
| 2012/0168607 A1* | 7/2012 | Okhmatovski | ......... | G01S 13/89 |
| | | | | 250/206 |
| 2013/0018585 A1* | 1/2013 | Zhdanov | ................ | G01V 3/083 |
| | | | | 702/2 |
| 2013/0018591 A1 | 1/2013 | Grzegorczyk | | |
| 2013/0135136 A1* | 5/2013 | Haynes | .................. | G01S 13/89 |
| | | | | 342/22 |

* cited by examiner

METHOD AND APPARATUS FOR RECONSTRUCTING DIELECTRIC IMAGE USING ELECTROMAGNETIC WAVES

RELATED APPLICATIONS

This application claims the benefit of Korean Patent Application No. 10-2013-0094863, filed on Aug. 9, 2013, which is hereby incorporated by reference as if fully set forth herein.

FIELD OF THE INVENTION

The present invention relates generally to a dielectric image reconstruction technique using electromagnetic waves, and more particularly to a method and apparatus for reconstructing a dielectric image using electromagnetic waves, which can reconstruct a three-dimensional image of dielectric properties distributed inside an imaging object using measured signals of incident and scattered electromagnetic waves, captured by received antennas.

BACKGROUND OF THE INVENTION

As is well known, the strength of electromagnetic waves is collected (acquired) by a detector (antenna) placed in a space where the electromagnetic waves propagate through an imaging object, and image of a dielectric characteristic distribution of the object is reconstructed through processing the collected data to display the reconstructed image through a monitor or the like.

That is, the electromagnetic waves that are transmitted in the space are measured, and a capturing dielectric image is created through image reconstruction program using measured values of incident and scattered electromagnetic wave values of the measured electromagnetic waves. Various numerical analysis methods and algorithms have been used to perform such image reconstruction.

However, since the existing numerical analysis methods are implemented through complicated algorithms, a large amount of computation is required, and thus the calculation time and memory capacity are large.

SUMMARY OF THE INVENTION

The present invention provides a new dielectric image reconstruction technique, which generates a transmitted and scattered waves in an image reconstruction region to acquire an image reconstruction values of measured electromagnetic waves through receiving the transmitted and scattered signals, and defines a fine mesh, a coarse mesh, and an image reconstruction mesh in the image reconstruction region.

Further, the present invention defines a matrix of matching system of basis functions that are centered at the image reconstruction mesh nodes, and defines a matrix of matching system basis functions that are centered at the coarse mesh nodes, and generates a smoothed dyadic Green's function matrix using the matrix of matching system of basis functions with respect to the coarse mesh nodes.

Further, the present invention defines the image reconstruction technique, which calculates electromagnetic waves propagating in the image reconstruction region using matrix of the smoothed dyadic Green's function, compares calculated and measured signals of incident and scattered electromagnetic waves, calculates a regularized Jacobian using the smoothed dyadic Green's function matrix and the matrix of matching system of the image reconstruction basis functions if a misfit error between the compared signals does not satisfy a misfit range (a predetermined optimization determination range), and then updates dielectric parameters at the image reconstruction mesh. Further, the present invention defines the image reconstruction technique, which outputs a optimized final image reconstruction values when the misfit error satisfies the misfit range as a result of updating the dielectric parameters at the image reconstruction mesh.

In accordance with the present invention, there is provided a method for reconstructing an image using electromagnetic waves, which includes: acquiring a measurement value of the electromagnetic waves that are radiated by a transmission antenna and propagated through an image reconstruction region; setting a plurality of predetermined meshes in the image reconstruction region; generating a matching system matrix between the meshes using basis functions of the plurality of predetermined meshes; generating a smoothed Green's function matrix using the generated matching system matrix; generating an electromagnetic wave calculation value through performing of a forward electromagnetic analysis with respect to the image reconstruction region on the basis of the generated smoothed Green's function matrix; calculating a misfit error between the acquired electromagnetic wave measurement value and the generated electromagnetic wave calculation value, and checking whether a change of the calculated error satisfies a predetermined optimization determination basis; updating dielectric parameters of the meshes if the predetermined optimization determination basis is not satisfied; and outputting a reconstructed image in the image reconstruction region when the predetermined optimization determination basis is satisfied.

In the embodiment, the plurality of meshes includes a fine mesh, a coarse mesh having a relatively larger spacing than the fine mesh, and an image reconstruction mesh having a relatively larger spacing than the coarse mesh.

In the embodiment, the plurality of meshes are in any one of rectangular grids or hexagonal grids.

In the embodiment, the basis functions allocated to the fine mesh with respect to the coarse mesh and the basis functions allocated to the fine mesh with respect to the image reconstruction mesh can be sinc-type function, spline function type or wavelet type.

In the embodiment, matrix $B_c$ of the matching system of the basis functions, which are allocated to the fine mesh, and with respect to the coarse mesh is generated as in an equation, $B_c = [b_{c,1}, b_{c,2}, b_{c,3}, \ldots, b_{c,n}, \ldots, b_{c,N_c}]$ where, $b_{c,n}$ denotes the basis function allocated to the fine mesh and centered at the n-th node of the coarse mesh, and $N_c$ denotes the total number of coarse mesh nodes.

In the embodiment, the matrix of matching system satisfies an equation, $R_c = B_c \cdot \tilde{B}_c^T = [r_{c,1}, r_{c,2}, r_{c,3} \ldots, r_{c,n}, \ldots, r_{c,N_f}]$ where, $R_c$ denotes a spatial resolution matrix, $\tilde{B}_c^T$ denotes a transpose matrix, which is dual to the matrix $B_c$, $r_{c,n}$ denotes a vector, which corresponds to a point spread function centered to the n-th node of fine mesh, and $N_f$ denotes the total number of fine meshes.

In the embodiment, wherein $R_c$ matrix has property of a spatial filter for smoothing an image reconstruction value.

In the embodiment, the matrix of matching system simultaneously satisfies two conditions: Condition 1: The effective width of the basis function is equal to or close to the grid spacing of the coarse mesh. Condition 2: All rows and columns of the spatial resolution matrix correspond to functions having the same shape and the same peak values but centered at different nodes of the fine mesh.

In the embodiment, the matrix $B_r$ of matching system of the basis functions, which are allocated at the fine mesh and with respect to the image reconstruction mesh are generated as in an equation, $B_r=[b_{r,1}, b_{r,2}, b_{r,3}, \ldots b_{r,n}, \ldots, b_{r,N_r}]$ where, $b_{r,n}$ denotes the basis function allocated to the fine mesh and centered at the n-th node of the image reconstruction mesh, and $N_r$ denotes the total number of image reconstruction mesh nodes.

In the embodiment, the generating the matching system matrix between the meshes comprises generating a spatial resolution matrix using multiplication of the matching system matrix and a transpose matrix, which is dual to the matching system matrix.

In the embodiment, the generating the smoothed dyadic Green's function matrix comprises generating the smoothed Green's function matrix by multiplying a Green's function matrix defined at the fine mesh by the matching system matrix and the transpose matrix, which is dual to the matching system matrix.

In the embodiment, the generating the smoothed dyadic Green's function matrix comprises: calculating the Green's function matrix at all the fine mesh nodes in the image reconstruction region for calculating scattered electromagnetic waves; and calculating the Green's function matrix for calculating scattered waves incident on receiving antennas.

In the embodiment, the performing the forward analysis comprises analyzing electromagnetic wave scattering with respect to the coarse mesh and calculating the electromagnetic waves that can be acquired in positions of the receiving antennas in form of receiving signals.

In the embodiment, the checking comprises determining that the predetermined optimization condition is satisfied if a misfit error between a measured signals and calculated signals is smaller than a predetermined allowable misfit range or exceeds a predetermined number of calculations.

In the embodiment, the updating the parameters comprises: generating a regularized Jacobian matrix using the generated matrix of matching system of basis functions, with respect to at the image reconstruction mesh, and the smoothed dyadic Green's function matrix; and updating the dielectric parameters at the coarse mesh using the generated regularized Jacobian matrix.

In the embodiment, the regularized Jacobian matrix $J_r$ is generated as in an equation, $$J_r(Tx/Rx) = \frac{1}{V_s(Tx/Rx)} \cdot \sum_{i=1}^{3} (G_{signal,c}(Rx) \cdot A \cdot B \cdot B_{cr}) X_i$$

where, $V_s(Tx/Rx)$ denotes value of signal of the incident wave, transmitted by Tx antenna and received by Rx antenna, $G_{signal,c}(Rx)$ is a matrix that denotes a electromagnetic waves scattered by the objects bounded with the basis functions with respect to the coarse mesh and detected by antennas Rx, A denotes a matrix by the relationship between contrast $C_c$ with respect to the coarse mesh and smoothed dyadic Green's function $G_c$ with respect to the coarse mesh, B denotes a diagonal matrix constructed with the total electric field at the coarse mesh nodes, and $B_{cr}$ denotes a matrix that determines image transformation from the image reconstruction mesh to the coarse mesh.

In the embodiment, the updating the dielectric parameters of the coarse mesh is expressed as in an equation, $\in_k = \in_{k-1} + \alpha_N \cdot \in_b \cdot (J_r^T \cdot J_r)^{-1} J_r^T \cdot \Delta\gamma$ where, $\alpha_N \cdot \in_b \cdot (J_r^T \cdot J_r)^{-1} J_r^T \cdot \Delta\gamma$ denotes parameter update values, and in the update value term, $\alpha_N$ denotes an increment value, $\in_b$ denotes a dielectric constant of a background material, $J_r^T$, denotes a regularized Jacobian matrix, a superscript T denotes a transpose matrix, a superscript '−1' denotes an inverse matrix, and $\Delta\gamma$ denotes an misfit between the electromagnetic wave measurement value and the electromagnetic wave calculation value.

In the embodiment, the outputting the reconstructed image comprises generating and outputting the reconstructed image as a visualization file that is visually identifiable or a data file.

In accordance with the present invention, there is provided an apparatus for reconstructing an image using electromagnetic waves, comprising: a measurement value acquisition block acquiring a measurement value of the electromagnetic waves that are radiated by a transmitting antenna and propagate through an image reconstruction region; a mesh setting block setting a plurality of predetermined meshes in the image reconstruction region; a matching system matrix generation block generating a matching system matrix between the meshes using basis functions of the plurality of predetermined meshes; a Green's function matrix generation block generating a smoothed Green's function matrix using the generated matching system matrix; an electromagnetic wave calculation block generating an electromagnetic field calculation value through performing of a forward electromagnetic analysis with respect to the image reconstruction region on the basis of the generated smoothed Green's function matrix; an optimization determination block calculating a misfit error between the acquired electromagnetic wave measurement value and the generated electromagnetic wave calculation value, and checking whether a change of the calculated misfit error satisfies a predetermined optimization determination range; a parameter updating block generating a regularized Jacobian matrix using the matching system matrix, the image reconstruction mesh, and the smoothed Green's function matrix, and updating dielectric parameters of the coarse mesh using the generated regularized Jacobian matrix if the predetermined optimization determination range is not satisfied; and an image reconstruction value generation block generating a reconstructed image in the image reconstruction region as a visualization file that is visually identifiable or a data file when the predetermined optimization determination basis is satisfied.

In the embodiment, the mesh setting block sets a fine mesh, a coarse mesh having a relatively larger spacing than the fine mesh, and an image reconstruction mesh having a relatively larger spacing than the coarse mesh as the plurality of meshes.

In accordance with the method for reconstructing an image according to the present invention, the computation amount can be greatly reduced in the forward electromagnetic analysis part. Further, in accordance with an apparatus for reconstructing a dielectric image using the method for reconstructing the image, the image reconstruction time can be greatly reduced (real-time image reconstruction can be achieved) through rapid computation due to the reduction of the computation amount.

BRIEF DESCRIPTION OF THE DRAWINGS

The objects and qualities of the present invention will become apparent from the following description of embodiments given in conjunction with the accompanying drawings, in which.

DETAILED DESCRIPTION OF THE EMBODIMENTS

The aspects and qualities of the present invention and methods for achieving the aspects and qualities will be apparent by referring to the embodiments to be described in detail with reference to the accompanying drawings. Here, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

Further, in the following description of the present invention, a detailed description of known functions and configurations incorporated herein will be omitted when it may make the subject matter of the present invention rather unclear. Also, the following terms are defined in consideration of the functions of the present invention, and may be differently defined according to the intention of an operator or custom. Therefore, the terms should be defined based on the overall contents of the specification.

Hereinafter, preferred embodiments of the present invention will be described in detail with reference to the accompanying drawings.

Embodiment

Figure 1:
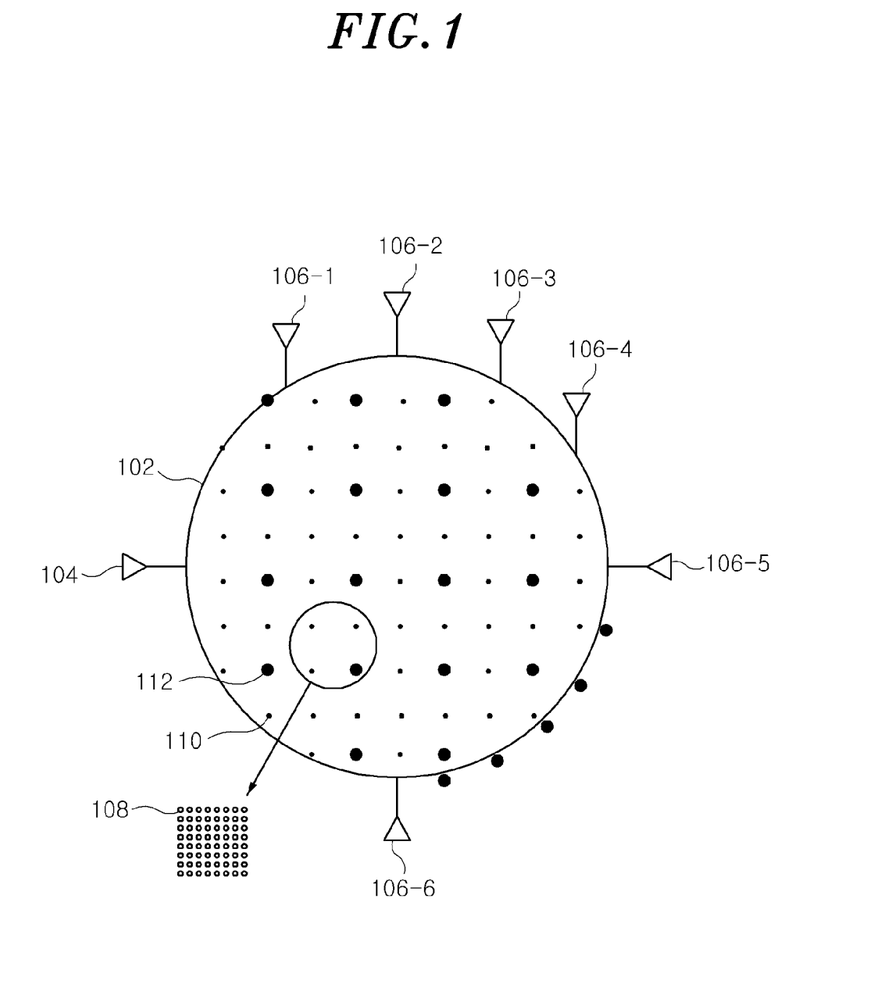
FIG. 1 is a diagram illustrating an image reconstruction region for a method for reconstructing an image according to an embodiment of the present invention.
Figure 2:
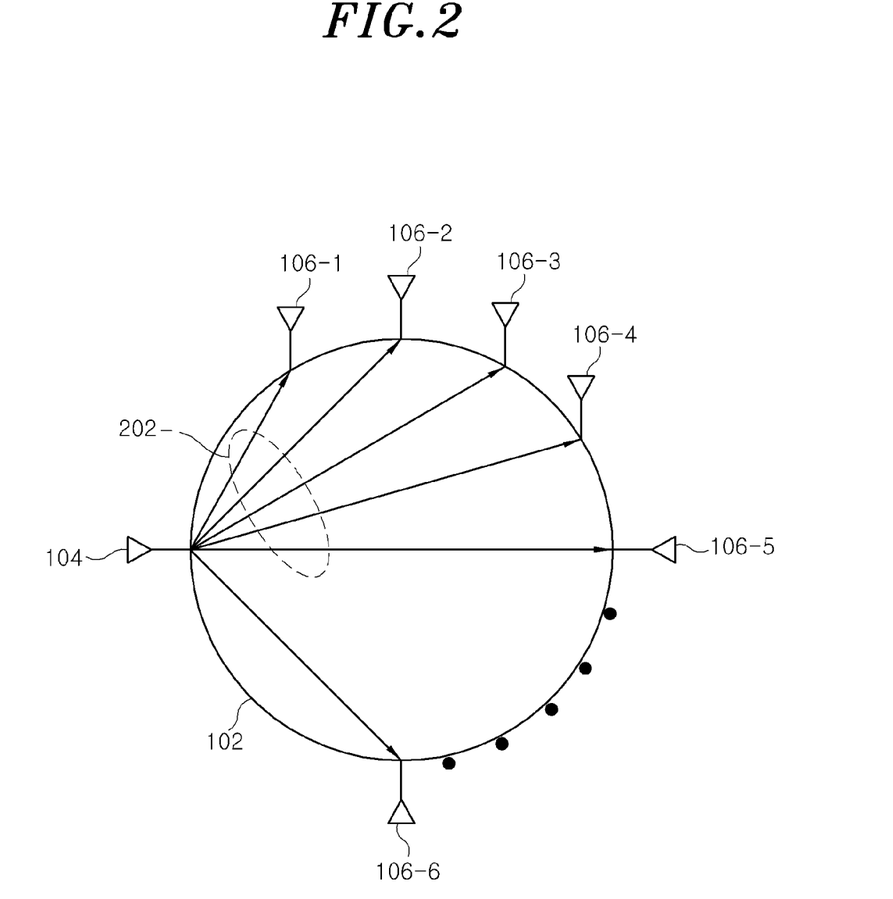
FIG. 2 is a diagram explaining a process in which electromagnetic waves radiated by a transmitting antenna are received with a plurality of receiving antennas after propagating through an image reconstruction region according to an embodiment of the present invention.

FIG. 1 is a diagram illustrating an image reconstruction region for a method for reconstructing an image according to an embodiment of the present invention, and FIG. 2 is a diagram explaining a process in which electromagnetic waves radiated by a transmitting antenna are received with a plurality of receiving antennas after propagating through an image reconstruction region accordingly to an embodiment of the present invention.

Referring to FIG. 1, a transmitting antenna 104 for radiating electromagnetic waves and a plurality of receiving antennas 106-1 to 106-6 for receiving an electromagnetic wave signals radiated by the transmitting antenna are positioned in the vicinity of or inside an image reconstruction region 102. An apparatus for reconstructing an image according to the present invention of the image reconstruction region 102 using the transmitting antenna 104 and the plurality of receiving antennas 106-1 to 106-6 for transmitting or receiving the electromagnetic waves.

The image reconstruction region 102 may be composed of a fine mesh 108, a coarse mesh 110, and an image restoration (reconstruction) mesh 112. The coarse mesh has a relatively larger spacing than the fine mesh 108, and the image reconstruction mesh 112 has a relatively larger spacing than the coarse mesh 110. Here, the respective meshes may be, for example, in any one of rectangular grids or hexagonal grids.

Referring to FIG. 2, the electromagnetic waves are radiated through the transmitting antenna 104, propagate through the image reconstruction region 102, and then incident on the plurality of receiving antennas 106-1 to 106-6 like it indicated by 202. The electromagnetic waves propagating through the image reconstruction region 102 are received (i.e., electromagnetic wave measurement values are acquired) through the plurality of receiving antennas 106-1 to 106-6.

Figure 3:
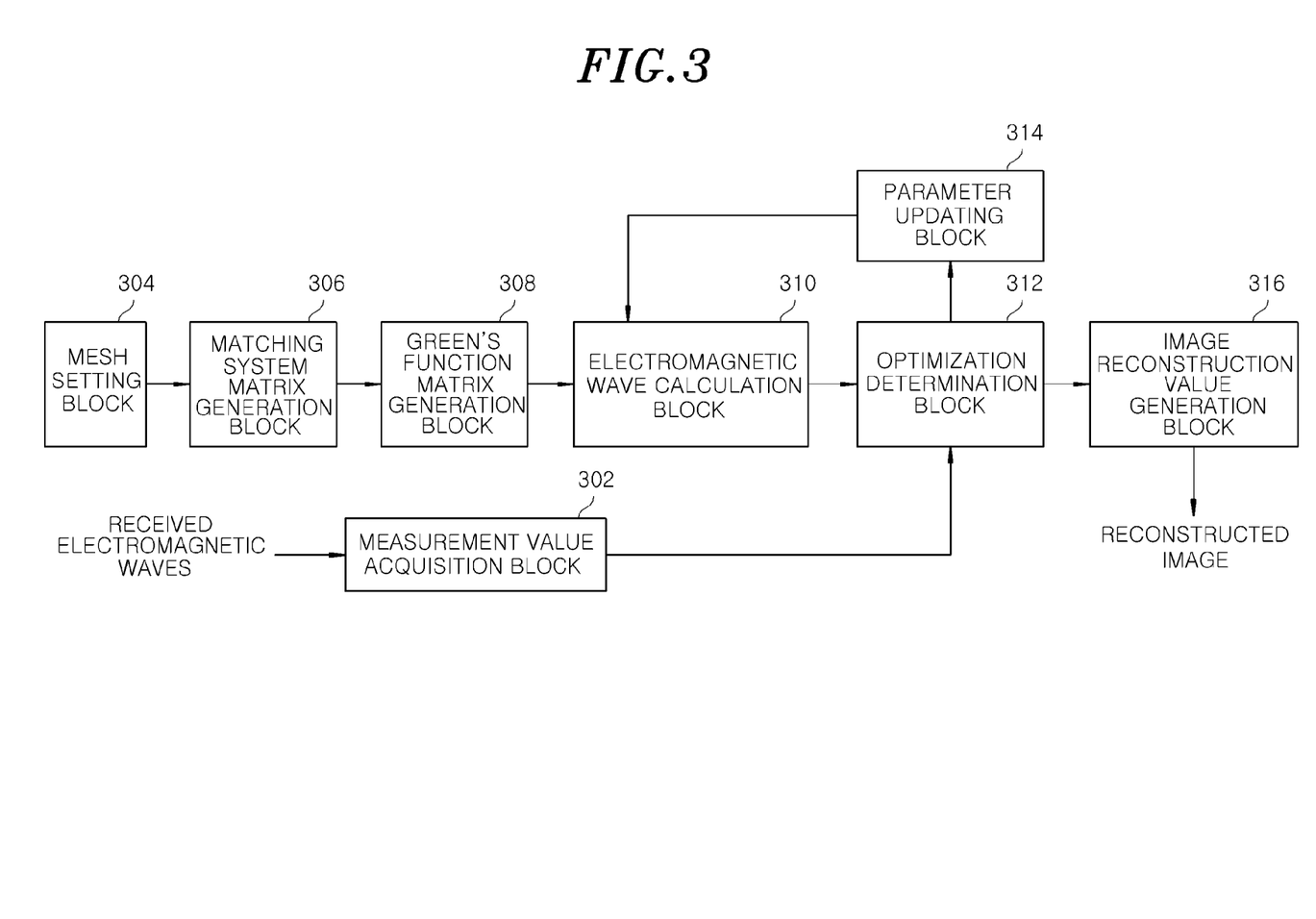
FIG. 3 is a block diagram illustrating the configuration of an apparatus for reconstructing an image using examination object with electromagnetic waves according to an embodiment of the present invention.

FIG. 3 is a block diagram illustrating the configuration of an apparatus for reconstructing an image using electromagnetic waves according to an embodiment of the present invention. The apparatus for reconstructing an image according to an embodiment of the present invention may include a measurement value acquisition block 302, a mesh setting block 304, a matching system matrix generation block 306, a Green's function matrix generation block 308, an electromagnetic field calculation block 310, an optimization determination block 312, a parameter updating block 314, and an image reconstruction value generation block 316.

Referring to FIG. 3, the measurement value acquisition block 302 may acquire electromagnetic wave measurement values of the electromagnetic waves, which are radiated by the transmitting antenna 104, propagate through the image reconstruction region 102, and then are received through the plurality of receiving antennas, for example, 106-1 to 106-6, and may transfer the acquired electromagnetic wave measurement values to the optimization determination block 312 to be described later.

Next, the mesh setting block 304 may define a plurality of predetermined meshes in the image reconstruction region 102, for example, a fine mesh 108, a coarse mesh 110 having a relatively larger spacing than the fine mesh 108, and an image reconstruction mesh 112 having a relatively larger spacing than the coarse mesh 110, and may set initial values of dielectric parameters at the respective meshes. Here, the fine mesh, the coarse mesh, and the image reconstruction mesh may be, for example, in any one of rectangular grids or hexagonal grids.

Further, the matrix of matching system generation block 306 may generate two types of matrixes of a matching system of basis functions allocated to the fine mesh and centered at 1) at the coarse mesh nodes and 2) at the image reconstruction mesh nodes, which are set as described above. Here, the basis functions corresponding to each of the meshes are defined, and the basis functions has the maximum value at coarse mesh nodes or at image reconstruction mesh nodes. That is, the matrix of matching system of the basis functions is generated using the basis functions, and the matching system matrix of the coarse mesh may be generated (expressed) as in Equation 1.

$$B_c = [b_{c,1}, b_{c,2}, b_{c,3}, \ldots, b_{c,n}, \ldots, b_{c,N_c}]$$ [Equation 1]

In Equation 1, $B_c$ denotes a matrix of the matching system of a basis functions allocated to the fine mesh 108 and with respect to the coarse mesh 110, denotes a vector of basis function centered at the n-th coarse mesh node, and $N_{c,n}$ denotes the total number of coarse mesh nodes. Here, the basis function allocated to the fine mesh and with respect to the coarse mesh may be a sinc-type function, spline function type or wavelet type.

Further, the above-described matrix of the matching system should satisfy Equation 2 below.

$$R_c \equiv B_c \cdot \tilde{B}_c^T = [r_{c,1}, r_{c,2}, r_{c,3}, \ldots, r_{c,n}, \ldots, r_{c,N_f}] \quad \text{[Equation 2]}$$

In Equation 2, $R_c$ denotes a spatial resolution matrix, $\tilde{B}_c^T$ denotes a transpose of matrix, which is dual to $B_c$, $r_{c,n}$ denotes a vector of a point spread function corresponding to the n-th fine mesh node, and $N_f$ denotes the total number of fine mesh nodes. Here, $R_c$ matrix has property of a spatial filter for smoothing an image reconstruction value.

Further, matrix $B_c$ of the matching system should simultaneously satisfy two conditions as follows.

Condition 1: The effective width of the basis function is equal to or close to the grid spacing of the coarse mesh.

Condition 2: All rows and columns of the spatial resolution matrix correspond to functions having the same shape and the same peak values but centered at different nodes of the fine mesh.

That is, generating matrix of the matching system includes generating the spatial resolution matrix using multiplication of the matching system matrix and the transpose matrix, which is dual to the matrix of the matching system.

The matrix of the matching system of the basis functions allocated to the fine mesh and with respect to the image reconstruction mesh having the characteristics described in Equation 1 and Equation 2 as above may be expressed as in Equation 3 below.

$$B_r = [b_{r,1}, b_{r,2}, b_{r,3}, \ldots, b_{r,n}, \ldots, b_{r,N_r}] \quad \text{[Equation 3]}$$

In Equation 3, $b_{r,n}$ denotes a basis function allocated to the fine mesh and centered at the n-th image reconstruction mesh node, and $N_r$ denotes the total number of image reconstruction mesh nodes.

Next, the Green's function generation block 308 generates a smoothed dyadic Green's function matrix using the matching system matrix, and generates a smoothed dyadic Green's function matrix by multiplying a dyadic Green's function matrix defined at the fine mesh by the matrix of the matching system and by the transpose matrix, which is dual to of the matching system matrix. Here, the smoothed dyadic Green's function matrix may be generated by calculating the dyadic Green's function matrix defined at all the fine mesh nodes in the image reconstruction region for calculating scattered electromagnetic waves in the image reconstruction region and calculating the dyadic Green's function matrix for calculating scattered waves incident on receiving antennas.

That is, the smoothed dyadic Green's function matrix is based on the dyadic Green's function matrix defined at the fine mesh nodes, and may be expressed as in Equation 4 below.

$$G_c = k_b^2 \cdot V_f \tilde{B}_c^T \cdot G_f B_c \quad \text{[Equation 4]}$$

In Equation 4, $G_f$ denotes a dyadic Green function defined at the fine mesh accordingly to an equation:

$$G_f(r_{ij}) = \frac{\exp(-ik_b r_{ij})}{4\pi r_{ij}} \cdot \left[\left(k_b^2 - i\frac{k_b}{r_{ij}} - \frac{1}{r_{ij}^2}\right) \cdot \bar{I} - \left(k_b^2 - i\frac{3k_b}{r_{ij}} - \frac{3}{r_{ij}^2}\right) \cdot \hat{r}_{ij}\hat{r}_{ij}\right],$$

$V_f$ denotes a volume of a fine mesh cell, $r_{ij}$ denotes a distance between points defined by vectors $r_i$ and $r_j$, $k_b$ denotes a wave number of a background material, $\bar{I}$ denotes an identity dyadic, and $\hat{r}_{ij}$ denotes a unit vector between points $r_i$ and $r_j$.

Further, the electromagnetic field calculation block 310 may generate an electromagnetic field calculation value by performing a forward electromagnetic analysis with respect to the image reconstruction region based on the smoothed Green's function matrix that is transferred from the Green's function matrix generation block 308, and may transfer the generated electromagnetic field calculation value to the optimization determination block 312. That is, the electromagnetic field calculation block 310 may analyze the electromagnetic wave scattering with respect to the coarse mesh through the forward electromagnetic analysis and may calculate the electromagnetic waves that can be acquired in positions of the receiving antennas.

That is, the electromagnetic wave calculation block 310 performs the forward electromagnetic solver calculation with respect to the image reconstruction region using the smoothed dyadic Green's function matrix that is generated by the Green's function matrix generation block 308. Equation 5 below is a generally known equation for obtaining the total electromagnetic waves, and is based on the fine mesh nodes.

$$E_f^{total} - G_f \cdot C_f \cdot E_f^{total} = E_f^{inc} \quad \text{[Equation 5]}$$

In Equation 5, $E_f^{total}$ denotes the total electric field with respect to the fine mesh, $G_f$ denotes a dyadic Green's function with respect to a fine mesh. $C_f$ denotes a contrast value between an imaging object placed in the image reconstruction region and a background material with respect to the fine mesh. $E_f^{inc}$ denotes electric field value of an incident electromagnetic wave with respect to the fine mesh. In this case, calculation with respect to the fine mesh is performed with a calculation amount that is proportional to square of numbers of the fine mesh nodes, and thus the calculation consumes a large amount of computer resources and time for forward electromagnetic numerical analysis is lengthened.

Equation 6 below is an equation with respect to coarse mesh nodes, and is followed from Equation 5 as described above.

$$E_c^{total} - G_c \cdot C_c \cdot E_c^{total} = E_c^{inc} \quad \text{[Equation 6]}$$

In order to convert the equation for fine mesh into an equation for coarse mesh as in Equation 6, multiplication of matching system matrices B, and $\tilde{B}_c^T$, is appropriately used in Equation 4 as described above. Through the conversion, $E_c^{total}$ denotes the total electric field value with respect to a coarse mesh, $G_c$ denotes a smoothed dyadic Green's function with respect to a coarse mesh, $C_c$ denotes a contrast value between an imaging object located in the image reconstruction region and a background material with respect to the coarse mesh, and $E_c^{inc}$ denotes an electric field value of incident electromagnetic wave with respect to the coarse mesh. As a result, since the forward electromagnetic numerical analysis with respect to the coarse mesh uses mesh nodes of which the number is smaller than the number of mesh nodes used in the numerical analysis with respect to the fine mesh, the calculation amount can be reduced, and a rapid calculation speed can be realized.

Further, electric field calculation value near receiving antennas is acquired through Equation 7 below.

$$V_s(Tx, Rx) = G_{signal,c}(Rx) \cdot C_c \cdot E_c^{total}(Tx) \quad \text{[Equation 7]}$$

In Equation 7, $V_s(Tx, Rx)$ denotes a calculation value of received signal of electromagnetic wave, which is transmitted from a transmitting antenna, propagates through an image reconstruction region, and then is received by receiving antennas, $G_{signal,c}(Rx)$ denotes a matrix of smoothed dyadic Green's function, which determines coupling between scattered waves with respect to the coarse mesh and a receiving antenna Rx, $C_c$ denotes a contrast value between an imaging object located in the image reconstruction region and a background material with respect to the coarse mesh and a parameter in an image reconstruction region, and $E_c^{total}(\text{Tx})$ denotes the total electric field value at the coarse mesh. The electromagnetic field calculation value may be calculated through multiplication of the above-described terms in Equation 7.

Next, the optimization determination block 312 calculates a misfit (difference) between the acquired electromagnetic wave value that is transferred from the measurement value acquisition block 302 and the generated electromagnetic field calculation value that is generated from the electromagnetic field calculation block 310, and determines whether a change of the calculated misfit error satisfies a predetermined optimization determination basis.

For example, if a difference value between the current misfit error and the previously calculated misfit error is smaller than a predetermined allowable difference value or exceeds a predetermined number of calculations, the optimization determination block 312 may determine that the predetermined optimization condition is satisfied. If it is determined that the predetermined optimization determination condition is not satisfied, the optimization determination block 312 generates and transfers a corresponding dielectric parameters update command (i.e., calculation update command for updating the dielectric parameters at the coarse mesh) to the parameter updating block 314, while if it is determined that the predetermined optimization determination condition is satisfied, the optimization determination block 312 generates and transfers a corresponding reconstructed image output command to the image reconstruction value generation block 316.

When the dielectric parameters update command is transferred from the optimization determination block 312, the parameter updating block 314 generates a regularized Jacobian matrix using the generated matching system matrix, the image reconstruction mesh, and the smoothed dyadic Green's function matrix, and updates the dielectric parameters at the coarse mesh using the generated regularized Jacobian matrix to transfer the updated parameters to the electromagnetic field calculation block 310.

That is, the parameter updating block 314 calculates the regularized Jacobian matrix using the matching system matrix of the basis function and the smoothed dyadic Green's function matrix. The regularized Jacobian matrix $J_r$ is $$J_r \equiv \frac{\partial \gamma}{\partial C_r},$$

$C_r$ indicates a contrast value between an imaging object located in the image reconstruction region and a background material with respect to the image reconstruction mesh, and $\gamma$ indicates the electromagnetic wave measurement value normalized to the electromagnetic wave measurement value for empty environment. This may be expressed as in Equation 8 below.

$$J_r(Tx/Rx) = \frac{1}{V_s(Tx/Rx)} \cdot \sum_{i=1}^{3} (G_{signal,c}(Rx) \cdot A \cdot B \cdot B_{cr})_{X_i} \quad \text{[Equation 8]}$$

In Equation 8, $J_r$ denotes a regularized Jacobian matrix, $V_s(\text{Tx/Rx})$ denotes a signal of the wave for empty environment, transmitted by Tx antenna and received by Rx antenna, $G_{signal,c}(\text{Rx})$ is a matrix of smoothed Green's function that denotes scattering electromagnetic waves with respect to the coarse mesh and receiving them with antennas Rx, A denotes a matrix by the relationship between contrast $C_c$ and smoothed dyadic Green's function $G_c$, B denotes a diagonal matrix constructed with the total electric field distributed at the coarse mesh, and $B_{cr}$ denotes a matrix that transforms images from the image reconstruction mesh to the coarse mesh. In Equation 8, the regularized Jacobian matrix is calculated using the image reconstruction mesh with spacing that is relatively larger than that of the coarse mesh.

The dielectric parameters at the coarse mesh are updated using the generated regularized Jacobian matrix, and such updating of the parameters at the coarse mesh may be expressed as in Equation 9 below.

$$\in_k = \in_{k-1} + \alpha_N \cdot \in_b \cdot (J_r^T \cdot J_r)^{-1} J_r^T \cdot \Delta\gamma \quad \text{[Equation 9]}$$

In Equation 9, $\alpha_N \cdot \in_b \cdot (J_r^T \cdot J_r)^{-1} J_r^T \cdot \Delta\gamma$ denotes dielectric parameters update values, and in the update value term, $\alpha_N$ denotes an increment coefficient, $\in_b$ denotes a permittivity of a background material, $J_r$ denotes a regularized Jacobian matrix, a superscript T denotes a transpose matrix, a superscript '−1' denotes an inverse matrix, and $\Delta\gamma$ denotes a misfit between the electromagnetic wave measurement value and the electromagnetic wave calculation value.

If the predetermined optimization determination condition is satisfied, the image reconstruction value generation block 316 may generate a reconstructed image (image reconstruction value) in the image reconstruction region as a visualization file that is visually identifiable or a data file when the reconstructed image output command is transferred from the optimization determination block 312, and output (or store) the generated file to a display block (not illustrated).

Next, a series of processes for reconstructing an image using electromagnetic waves through the apparatus for reconstructing the image according to the present invention as described above will be described in detail.

Figure 4:
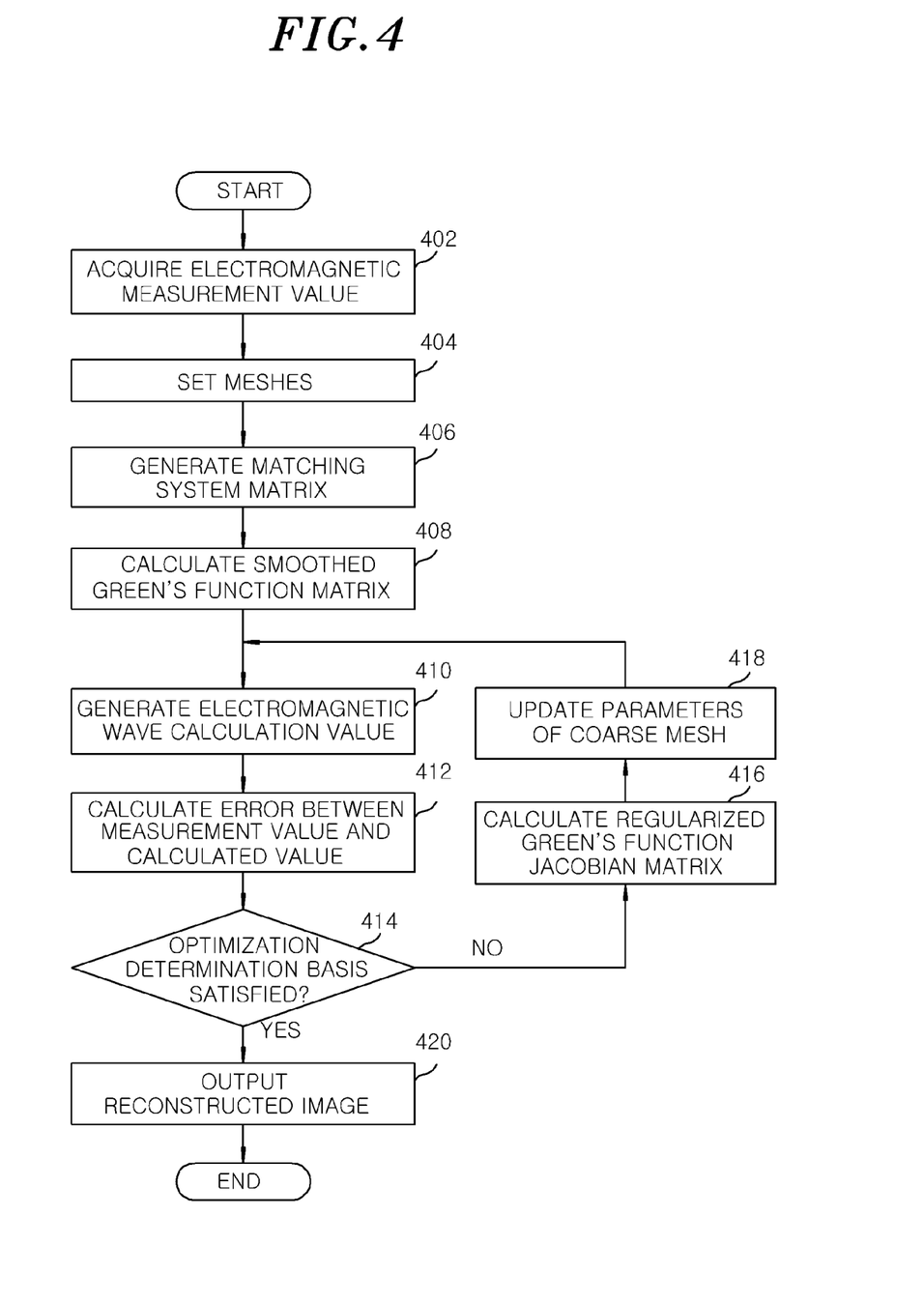
FIG. 4 is a flowchart illustrating a main process for reconstructing an image using electromagnetic waves according to an embodiment of the present invention.

FIG. 4 is a flowchart illustrating a main process for reconstructing an image using electromagnetic waves according to an embodiment of the present invention.

Referring to FIG. 4, if electromagnetic waves, which are radiated by the transmitting antenna 104 and propagate through the image reconstruction region 102, are received through the plurality of receiving antennas, for example, 106-1 to 106-6, the measurement value acquisition block 302 acquires the electromagnetic wave measurement values of the received electromagnetic waves, and then transfers the acquired electromagnetic wave measurement values to the optimization determination block 312 (414).

Next, the mesh setting block 304 defines a plurality of predetermined meshes in the image reconstruction region 102, for example, a fine mesh, a coarse mesh having a relatively larger spacing than the fine mesh, and an image reconstruction mesh having a relatively larger spacing than the coarse mesh, and sets initial values of dielectric parameters at the respective meshes (404). Here, the fine mesh, the coarse mesh, and the image reconstruction mesh may be, for example, in any one of rectangular grids or hexagonal grids.

Further, the matching system matrix generation block 306 generates a matrix of matching system of basis functions allocated at the fine mesh and centered at the coarse mesh nodes and at the image reconstruction mesh nodes, which are set as described above (406). Here, the basis function corresponding to each of the meshes has the maximum values at the coarse mesh nodes and at the image reconstruction mesh nodes.

Next, the Green's function generation block 308 generates a smoothed Green's function matrix using the matching system matrix of basis functions with respect to the coarse mesh. More specifically, a smoothed dyadic Green's function matrix is generated by multiplying a dyadic Green's function matrix defined at the fine mesh by the matching system matrix and the transpose matrix, which is dual to the matching system matrix (408). That is, the smoothed dyadic Green's function matrix is generated by calculating the dyadic Green's function matrix defined at all the fine mesh in the image reconstruction region for calculating scattered electromagnetic waves in the image reconstruction region and calculating the smoothed dyadic Green's function matrix for calculating scattered waves incident on the receiving antennas.

Further, the electromagnetic field calculation block 310 generates an electromagnetic wave calculation value by performing a forward electromagnetic analysis with respect to the image reconstruction region based on the smoothed Green's function matrix (410), and transfers the generated electromagnetic wave calculation value to the optimization determination block 312. That is, the electromagnetic field calculation block 310 analyzes the electromagnetic wave scattering with respect to the coarse mesh through the forward electromagnetic analysis, and calculates the electromagnetic waves that can be acquired in positions of the receiving antennas.

Next, the optimization determination block 312 calculates an misfit error (difference) between the acquired electromagnetic field value that is transferred from the measurement value acquisition block 302 and the generated electromagnetic field calculation value that is generated through the electromagnetic field calculation block 310 (412), and checks (determines) whether the calculated misfit error satisfies the predetermined optimization determination condition (414).

If it is determined that the predetermined optimization determination condition is not satisfied as the result of the checking (414), the optimization determination block 312 generates and transfers a corresponding parameter update command (i.e., calculation request command for updating parameters at the image reconstruction mesh) to the parameter updating block 314.

As a result, the parameter updating block 314 generates the regularized Jacobian matrix using the generated matching system matrix, the image reconstruction mesh, and the smoothed dyadic Green's function matrix (416), and updates dielectric parameters at the coarse mesh using the generated regularized Jacobian matrix (418). The following process proceeds to the above-described process (410).

If it is determined that the predetermined optimization determination condition is satisfied, for example, if the difference value between the current misfit error and the previously calculated misfit error is smaller than the predetermined allowable difference value or exceeds the predetermined number of calculations, as the result of the checking (414), the optimization determination block 312 generates and transfers the corresponding reconstructed image output command to the image reconstruction value generation block 316.

In response to this, the image reconstruction value generation block 316 generates the reconstructed image (image reconstruction value) in the image reconstruction region as the visualization file that is visually identifiable or the data file, and outputs (or stores) the generated file to the display side (not illustrated) (420).

The description of the present invention as described above is merely exemplary, and it will be understood by those of ordinary skill in the art to which the present invention pertains that various changes in form and detail may be made therein without changing the technical idea or essential features of the present invention. Accordingly, it will be understood that the above-described embodiments are exemplary in all aspects, and do not limit the scope of the present invention.

Accordingly, the scope of the present invention is defined by the appended claims, and it will be construed that all corrections and modifications derived from the meanings and scope of the following claims and the equivalent concept fall within the scope of the present invention.

What is claimed is:

1. A method for reconstructing an image using electromagnetic waves, comprising:
   acquiring a measurement value of the electromagnetic waves that are radiated by a transmitting antenna and propagate through an image reconstruction region;
   setting a plurality of predetermined meshes in the image reconstruction region;
   generating a matching system matrixes using basis functions related to the plurality of predetermined meshes;
   generating a smoothed Green's function matrix using the generated matching system matrix;
   generating an electromagnetic wave calculation value through performing of a forward electromagnetic analysis with respect to the image reconstruction region on the basis of the generated smoothed dyadic Green's function matrix;
   calculating a misfit between the acquired electromagnetic wave measurement value and the generated electromagnetic wave calculation value, and checking whether a the calculated misfit error satisfies a predetermined optimization determination condition;
   updating the dielectric parameters at the meshes if the predetermined optimization determination condition is not satisfied; and
   outputting a reconstructed image in the image reconstruction region when the predetermined optimization determination condition is satisfied.

2. The method of claim 1, wherein the plurality of meshes include a fine mesh, a coarse mesh having a relatively larger spacing than the fine mesh, and an image reconstruction mesh having a relatively larger spacing than the coarse mesh.

3. The method of claim 2, wherein the plurality of meshes are in any one of rectangular grids, or hexagonal grids.

4. The method of claim 2, wherein the basis function corresponding to the fine mesh and the coarse mesh and the basis function corresponding to the coarse mesh and the image reconstruction mesh are in a sinc-type function, spline function type or wavelet type.

5. The method of claim 2, wherein the matrix $B_c$ of matching system of the basis function, allocated at the fine mesh and centered at the coarse mesh nodes is generated as in an equation, $$B_c = [b_{c,1}, b_{c,2}, b_{c,3}, \ldots, b_{c,n}, \ldots, b_{c,N_c}]$$

where, $b_{c,n}$ denotes the vectors of basis function allocated to the fine mesh and centered at the n-th node of coarse mesh, and $N_c$ denotes the total number of coarse mesh nodes.

6. The method of claim 5, wherein the matching system matrix satisfies an equation, $$R_c = B_c \cdot \tilde{B}_c^T = [r_{c,1}, r_{c,2}, r_{c,3}, \ldots, r_{c,n}, \ldots, r_{c,N_f}]$$

where, $R_c$ denotes a spatial resolution matrix, $\tilde{B}_c^T$: denotes a transpose matrix, which is dual to $B_c$, $r_{c,n}$ denotes a vector of a point spread function corresponding to the n-th fine mesh node, and $N_f$ denotes the total number of fine mesh nodes.

7. The method of claim 6, wherein $R_c$ has property of a spatial filter for smoothing an image reconstruction value.

8. The method of claim 6, wherein the matching system matrix simultaneously satisfies two conditions:
Condition 1: The effective width of the basis function is equal to or close to the grid spacing of the coarse mesh
Condition 2: All rows and columns of the spatial resolution matrix correspond to functions having the same shape and the same peak values but centered at different nodes of the fine mesh.

9. The method of claim 5, wherein the matching system matrix $B_r$ of the basis functions allocated to the fine mesh and centered at the image reconstruction mesh nodes is generated as in an equation, $$B_r = [b_{r,1}, b_{r,2}, b_{r,3}, \ldots, b_{r,n}, \ldots, b_{r,N_r}]$$

where, $b_{r,n}$ denotes the basis function allocated to the fine mesh and centered at the n-th node of image reconstruction mesh, and $N_r$ denotes the total number of image reconstruction mesh nodes.

10. The method of claim 9, wherein the generating the matching system matrix comprises generating a spatial resolution matrix using multiplication of the matching system matrix and a transpose matrix, which is dual to the matching system matrix.

11. The method of claim 2, wherein the generating the smoothed Green's function matrix comprises generating the smoothed Green's function matrix by multiplying a Green's function matrix defined at the fine mesh by the matching system matrix and a transpose matrix, which is dual to the matching system matrix.

12. The method of claim 11, wherein the generating the smoothed Green's function matrixes comprises:
calculating the dyadic Green's function matrix defined at all the fine mesh nodes in the image reconstruction; and
calculating the dyadic Green's function matrix for calculating scattered waves incident on receiving antennas.

13. The method of claim 2, wherein the performing the forward electromagnetic analysis comprises analyzing electromagnetic wave scattering with respect to the coarse mesh and calculating the electromagnetic waves that can be acquired in positions of the receiving antennas.

14. The method of claim 1, wherein the checking comprises determining that the predetermined optimization condition is satisfied if a difference value between a current misfit error and a previously calculated misfit error is smaller than a predetermined allowable difference value or exceeds a predetermined number of calculations.

15. The method of claim 2, wherein the updating the dielectric parameters comprises:
generating a regularized Jacobian matrix using the generated matching system matrix with respect to the image reconstruction mesh, and the smoothed dyadic Green's function matrix; and
updating the dielectric parameters at the coarse mesh using the generated regularized Jacobian matrix.

16. The method of claim 15, wherein the regularized Jacobian matrix $J_r$ is generated as in an equation, $$J_r(Tx/Rx) = \frac{1}{V_s(Tx/Rx)} \cdot \sum_{i=1}^{3} (G_{signal,c}(Rx) \cdot A \cdot B \cdot B_{cr})_{X_i}$$

where, $V_s(Tx/Rx)$ denotes a voltage of signal of the wave for empty environment, transmitted by Tx antenna and received by Rx antenna, $G_{signal,c}(Rx)$ is a matrix of smoothed dyadic Green's function that denotes scattering electromagnetic waves with respect to the coarse mesh and receiving them with antennas Rx, A denotes a matrix by the relationship between contrast $C_c$ with respect to the coarse mesh and smoothed dyadic Green's function $G_c$ with respect to the coarse mesh, B denotes a diagonal matrix constructed with the total electric field distributed at the coarse mesh, and $B_{cr}$ denotes a matrix that transforms images from the image reconstruction mesh to the coarse mesh.

17. The method of claim 15, wherein the updating the dielectric parameters at the coarse mesh is expressed as in an equation, $$\in_k = \in_{k-1} + \alpha_N \cdot \in_b \cdot (J_r^T \cdot J_r)^{-1} J_r^T \cdot \Delta\gamma$$

where, $\alpha_N \cdot \in_b \cdot (J_r^T \cdot J_r)^{-1} J_r^T \cdot \Delta\gamma$ denotes dielectric parameters update values, and in the update value term, $\alpha_N$ denotes an increment coefficient, $\in_b$ denotes a permittivity of a background material, $J_r$ denotes a regularized Jacobian matrix, a superscript T denotes a transpose matrix, a superscript '−1' denotes an inverse matrix, and $\Delta\gamma$ denotes an misfit between the electromagnetic wave measurement value and the electromagnetic wave calculation value.

18. The method of claim 1, wherein the outputting the reconstructed image comprises generating and outputting the reconstructed image as a visualization file that is visually identifiable or a data file.

19. An apparatus for reconstructing an image using electromagnetic waves, comprising:
a measurement value acquisition block acquiring a measurement value of the electromagnetic waves that are radiated by a transmitting antenna and propagate through an image reconstruction region;
a mesh setting block setting a plurality of predetermined meshes in the image reconstruction region;
a matching system matrix generation block generating a matching system matrix using basis functions related to the plurality of predetermined meshes;
a Green's function matrix generation block generating a smoothed Green's function matrix using the generated matching system matrix;
an electromagnetic wave calculation block generating an electromagnetic wave calculation value through performing of a forward electromagnetic analysis with respect to the image reconstruction region on the basis of the generated smoothed Green's function matrix;
an optimization determination block calculating an misfit error between the acquired electromagnetic wave measurement value and the generated electromagnetic wave calculation value, and checking whether the calculated misfit error satisfies a predetermined optimization determination condition;
a parameter updating block generating a regularized Jacobian matrix using the matching system matrix, the image reconstruction mesh, and the smoothed Green's function matrix, and updating dielectric parameters at the coarse mesh using the generated regularized Jacobian matrix if the predetermined optimization determination condition is not satisfied; and an image reconstruction value generation block generating a reconstructed image in the image reconstruction region as a visualization file that is visually identifiable or a data file when the predetermined optimization determination condition is satisfied.

20. The apparatus of claim 19, wherein the mesh setting block sets a fine mesh, a coarse mesh having a relatively larger spacing than the fine mesh, and an image reconstruction mesh having a relatively larger spacing than the coarse mesh as the plurality of meshes.

* * * * *